United States Patent
Korpi et al.

(10) Patent No.: US 12,470,317 B2
(45) Date of Patent: Nov. 11, 2025

(54) JAMMING SIGNAL CANCELLATION

(71) Applicant: NOKIA SOLUTIONS AND NETWORKS OY, Espoo (FI)

(72) Inventors: Dani Johannes Korpi, Helsinki (FI); Karthik Upadhya, Espoo (FI); Martti Johannes Moisio, Klaukkala (FI); Tero Johannes Ihalainen, Nokia (FI); Mikko Aleksi Uusitalo, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 423 days.

(21) Appl. No.: 18/007,542

(22) PCT Filed: Jun. 1, 2020

(86) PCT No.: PCT/EP2020/065106
§ 371 (c)(1),
(2) Date: Dec. 1, 2022

(87) PCT Pub. No.: WO2021/244726
PCT Pub. Date: Dec. 9, 2021

(65) Prior Publication Data
US 2023/0231644 A1   Jul. 20, 2023

(51) Int. Cl.
*H04K 3/00* (2006.01)
(52) U.S. Cl.
CPC .................. *H04K 3/228* (2013.01)
(58) Field of Classification Search
CPC ............. H04K 3/228; H04K 2203/16; H04K 2203/18; H04K 2203/32; H04K 2203/36

USPC ........................................................ 455/296
See application file for complete search history.

(56) References Cited

U.S. PATENT DOCUMENTS

| | | | |
|---|---|---|---|
| 2010/0289688 A1 | 11/2010 | Sherman et al. | |
| 2014/0038536 A1* | 2/2014 | Welnick | H04B 1/1027 455/154.1 |
| 2014/0165144 A1* | 6/2014 | Kim | H04K 3/28 726/3 |
| 2014/0170963 A1 | 6/2014 | Delaveau et al. | |
| 2015/0141026 A1 | 5/2015 | Jover | |
| 2015/0381221 A1 | 12/2015 | Cyzs et al. | |
| 2017/0346514 A1 | 11/2017 | Dimpflmaier et al. | |
| 2018/0083728 A1* | 3/2018 | Yu | H04K 3/43 |
| 2020/0106545 A1* | 4/2020 | Askar | H04W 72/541 |

(Continued)

FOREIGN PATENT DOCUMENTS

| | | |
|---|---|---|
| IN | 201727006425 A | 4/2017 |
| WO | 2020/058878 A1 | 3/2020 |

OTHER PUBLICATIONS

International Search Report and Written Opinion dated Feb. 3, 2021 corresponding to International Patent Application No. PCT/EP2020/065106.

(Continued)

*Primary Examiner* — Don N Vo
(74) *Attorney, Agent, or Firm* — SQUIRE PATTON BOGGS (US) LLP

(57) ABSTRACT

There is disclosed an apparatus. The apparatus comprises means for performing: in response to detecting a jamming signal, obtaining a sample waveform of the jamming signal; and sending information of the jamming signal to another apparatus.

23 Claims, 9 Drawing Sheets

S1: In response to detecting a jamming signal, obtaining a sample waveform of the jamming signal S2: Sending information of the jamming signal to another apparatus

(56) References Cited

U.S. PATENT DOCUMENTS

2022/0077878 A1* 3/2022 Husain .................. G06N 3/044

OTHER PUBLICATIONS

Notification of the First Office Action dated Jun. 27, 2024 corresponding to Chinese Patent Application No. 2020801045003, with English translation thereof.
European Communication pursuant to Article 94(3) EPC corresponding to EP Application No. 20 735 485.3, dated Jun. 2, 2025.

* cited by examiner

JAMMING SIGNAL CANCELLATION

FIELD

This disclosure relates to communications. More particularly the present disclosure relates to apparatuses, methods, and computer programs for cancelling jamming signals in a communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite-based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved.

Since introduction of fourth generation (4G) services, increasing interest has been paid to the next, or fifth generation (5G) standard. 5G may also be referred to as a New Radio (NR) network.

One component of the 5G standard is ultra-reliable low latency communications (URLLC). URLLC may have particular utility in industrial settings, where control information is transferred on links between various entities. An undesirable jamming signal could prevent URLLC from being achieved.

EXAMPLES

According to some aspects, there is provided the subject matter of the independent claims. Some further aspects are defined in the dependent claims. The embodiments that do not fall under the scope of the claims are to be interpreted as examples useful for understanding the disclosure.

According to a first aspect, there is provided an apparatus comprising means for performing: in response to detecting a jamming signal, obtaining a sample waveform of the jamming signal; and sending information of the jamming signal to another apparatus.

According to some examples, the means are further configured to perform steering a receive beam of the apparatus towards the detected jamming signal.

According to some examples, the means are further configured to perform avoiding interfering signals from one or more scheduled user equipment, when obtaining the sample waveform.

According to some examples, the means are further configured to perform spatial domain filtering in order to avoid the interfering signals from one or more scheduled user equipment.

According to some examples, the means are further configured to perform null-steering towards the one or more scheduled user equipment.

According to some examples, the means are further configured to perform using energy detection in order to perform the detecting a jamming signal.

According to some examples, the means are further configured to perform using one or more key performance indicators to perform the detecting a jamming signal.

According to some examples, the means are further configured to perform requesting the one or more key performance indicators.

According to some examples, the means are further configured to perform generating a flag, the information of the jamming signal comprising the flag.

According to some examples, the sending information of the jamming signal comprises sending the obtained sample waveform to the another apparatus.

According to some examples, the means are further configured to perform processing of the obtained sample in order to improve the sample.

According to some examples, the processing the obtained sample comprises filtering the jamming signal based on a detected bandwidth of the jamming signal.

According to some examples, the apparatus comprises a dedicated jamming signal receiver, located separately from one or more base stations.

According to some examples, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: in response to detecting a jamming signal, obtaining a sample waveform of the jamming signal; and sending information of the jamming signal to another apparatus.

According to some examples, the at least one memory and the computer program code are configured to, with the at least one processor, cause the apparatus at least to perform: steering a receive beam of the apparatus towards the detected jamming signal.

According to some examples, the at least one memory and the computer program code are configured to, with the at least one processor, cause the apparatus at least to perform:

avoiding interfering signals from one or more scheduled user equipment, when obtaining the sample waveform.

According to some examples, the at least one memory and the computer program code are configured to, with the at least one processor, cause the apparatus at least to perform: spatial domain filtering in order to avoid the interfering signals from one or more scheduled user equipment.

According to some examples, the at least one memory and the computer program code are configured to, with the at least one processor, cause the apparatus at least to perform: null-steering towards the one or more scheduled user equipment.

According to some examples, the at least one memory and the computer program code are configured to, with the at least one processor, cause the apparatus at least to perform: using energy detection in order to perform the detecting a jamming signal.

According to some examples, the at least one memory and the computer program code are configured to, with the at least one processor, cause the apparatus at least to perform: using one or more key performance indicators to perform the detecting a jamming signal.

According to some examples, the at least one memory and the computer program code are configured to, with the at least one processor, cause the apparatus at least to perform: requesting the one or more key performance indicators.

According to some examples, the at least one memory and the computer program code are configured to, with the at least one processor, cause the apparatus at least to perform: generating a flag, the information of the jamming signal comprising the flag.

According to some examples, the sending information of the jamming signal comprises sending the obtained sample waveform to the another apparatus.

According to some examples, the at least one memory and the computer program code are configured to, with the at least one processor, cause the apparatus 5 at least to perform: processing of the obtained sample in order to improve the sample.

According to some examples, the processing the obtained sample comprises filtering the jamming signal based on a detected bandwidth of the jamming signal.

According to some examples, the apparatus comprises a dedicated jamming signal receiver, located separately from one or more base stations.

According to a third aspect there is provided an apparatus comprising circuitry for, in response to detecting a jamming signal, obtaining a sample waveform of the jamming signal; and circuitry for sending information of the jamming signal to another apparatus.

According to a fourth aspect there is provided a method comprising: in response to detecting a jamming signal at an apparatus, obtaining a sample waveform of the jamming signal; and sending information of the jamming signal to another apparatus.

According to some examples, the method comprises steering a receive beam of the apparatus towards the detected jamming signal.

According to some examples, the method comprises avoiding interfering signals from one or more scheduled user equipment, when obtaining the sample waveform.

According to some examples, the method comprises performing spatial domain filtering in order to avoid the interfering signals from one or more scheduled user equipment.

According to some examples, the method comprises performing null-steering towards the one or more scheduled user equipment.

According to some examples, the method comprises using energy detection in order to perform the detecting a jamming signal.

According to some examples, the method comprises using one or more key performance indicators to perform the detecting a jamming signal.

According to some examples, the method comprises requesting the one or more key performance indicators.

According to some examples, the method comprises generating a flag, the information of the jamming signal comprising the flag.

According to some examples, the sending information of the jamming signal comprises sending the obtained sample waveform to the another apparatus.

According to some examples, the method comprises performing processing of the obtained sample in order to improve the sample.

According to some examples, the processing the obtained sample comprises filtering the jamming signal based on a detected bandwidth of the jamming signal.

According to some examples, the apparatus comprises a dedicated jamming signal receiver, located separately from one or more base stations.

According to a fifth aspect there is provided a computer program comprising instructions for causing an apparatus to perform at least the following: in response to detecting a jamming signal at the apparatus, obtaining a sample waveform of the jamming signal; and sending information of the jamming signal to another apparatus.

According to a sixth aspect there is provided a computer program comprising instructions stored thereon for performing at least the following: in response to detecting a jamming signal at an apparatus, obtaining a sample waveform of the jamming signal; and sending information of the jamming signal to another apparatus.

According to a seventh aspect there is provided a non-transitory computer readable medium comprising program instructions for causing an apparatus to perform at least the following: in response to detecting a jamming signal at the apparatus, obtaining a sample waveform of the jamming signal; and sending information of the jamming signal to another apparatus.

According to an eighth aspect there is provided a non-transitory computer readable medium comprising program instructions stored thereon for performing at least the following: in response to detecting a jamming signal at an apparatus, obtaining a sample waveform of the jamming signal; and sending information of the jamming signal to another apparatus.

According to a ninth aspect there is provided an apparatus comprising means for performing: receiving a sample waveform of a jamming signal from another apparatus; and initiating interference cancellation of the jamming signal using the sample waveform.

According to some examples, the means are further configured to perform synchronizing the received sample waveform with the jamming signal as received at the apparatus from a source of the jamming signal, the source of the jamming signal comprising a jammer.

According to some examples, the means are further configured to use a learning rule to minimize energy of the jamming signal.

According to some examples, the received sample waveform comprises an input to the learning rule.

According to some examples, the means are further configured to perform using an output of the learning rule to select a filter for filtering the jamming signal.

According to some examples, the means are further configured to perform temporarily disabling uplink scheduling of one or more user equipment, in order to improve a quality of the received sample waveform.

According to some examples, the apparatus comprises a base station.

According to some examples, the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving a sample waveform of a jamming signal from another apparatus; and initiating interference cancellation of the jamming signal using the sample waveform.

According to some examples, the at least one memory and the computer program code are configured to, with the at least one processor, cause the apparatus at least to perform: synchronizing the received sample waveform with the jamming signal as received at the apparatus from a source of the jamming signal, the source of the jamming signal comprising a jammer.

According to some examples, the at least one memory and the computer program code are configured to, with the at least one processor, cause the apparatus at least to perform: using a learning rule to minimize energy of the jamming signal.

According to some examples, the received sample waveform comprises an input to the learning rule.

According to some examples, the at least one memory and the computer program code are configured to, with the at least one processor, cause the apparatus at least to perform: using an output of the learning rule to select a filter for filtering the jamming signal.

According to some examples, the at least one memory and the computer program code are configured to, with the at least one processor, cause the apparatus at least to perform: temporarily disabling uplink scheduling of one or more user equipment, in order to improve a quality of the received sample waveform.

According to some examples, the apparatus comprises a base station.

According to an eleventh aspect, there is provided an apparatus comprising: circuitry for receiving a sample waveform of a jamming signal from another apparatus; and circuitry for initiating interference cancellation of the jamming signal using the sample waveform.

According to a twelfth aspect there is provided a method comprising: receiving, at an apparatus, a sample waveform of a jamming signal from another apparatus; and initiating interference cancellation of the jamming signal using the sample waveform.

According to some examples, the method comprises synchronizing the received sample waveform with the jamming signal as received at the apparatus from a source of the jamming signal, the source of the jamming signal comprising a jammer.

According to some examples, the method comprises using a learning rule to minimize energy of the jamming signal.

According to some examples, the received sample waveform comprises an input to the learning rule.

According to some examples, the method comprises using an output of the learning rule to select a filter for filtering the jamming signal.

According to some examples, the method comprises temporarily disabling uplink scheduling of one or more user equipment, in order to improve a quality of the received sample waveform.

According to some examples, the apparatus comprises a base station.

According to a thirteenth aspect there is provided a computer program comprising instructions for causing an apparatus to perform at least the following: receiving, at the apparatus, a sample waveform of a jamming signal from another apparatus; and initiating interference cancellation of the jamming signal using the sample waveform.

According to a fourteenth aspect there is provided a computer program comprising instructions stored thereon for performing at least the following: receiving, at an apparatus, a sample waveform of a jamming signal from another apparatus; and initiating interference cancellation of the jamming signal using the sample waveform.

According to a fifteenth aspect there is provided a non-transitory computer readable medium comprising program instructions for causing an apparatus to perform at least the following: receiving, at an apparatus, a sample waveform of a jamming signal from another apparatus; and initiating interference cancellation of the jamming signal using the sample waveform.

According to a sixteenth aspect there is provided a non-transitory computer readable medium comprising program instructions stored thereon for performing at least the following: receiving, at an apparatus, a sample waveform of a jamming signal from another apparatus; and initiating interference cancellation of the jamming signal using the sample waveform.

According to a seventeenth aspect there is provided a system comprising: one or more base stations; a jamming signal receiver spaced apart from the one or more base stations; a network apparatus in communication with the one or more base stations and the auxiliary jamming signal receiver; and wherein in response to a jamming signal received at the jamming signal receiver, the jamming signal receiver configured to provide the network apparatus with a sample of the jamming signal, the network apparatus configured to send the sample of the jamming signal to the at least one base station; and in response thereto, the at least one base station configured to initiate interference cancellation of the jamming signal.

According to some examples, the jamming signal receiver is configured to perform detection of the jamming signal using energy detection.

According to some examples, the network apparatus is configured to perform detection of the jamming signal using one or more key performance indicators.

According to some examples the jamming signal receiver is located at a height that is above a height of the one or more base stations.

According to some examples the system is configured for ultra reliable low latency communications.

According to an eighteenth aspect there is provided a method comprising: in response to a jamming signal received at a jamming signal receiver, the jamming signal receiver providing a network apparatus with a sample of the jamming signal; sending the sample of the jamming signal from the network apparatus to at least one base station; and in response, the at least one base station initiating interference cancellation of the jamming signal.

BRIEF DESCRIPTION OF FIGURES

The invention will now be described in further detail, by way of example only, with reference to the following examples and accompanying drawings, in which.

DETAILED DESCRIPTION

Ultra-reliable low latency communications (URLLC) is a component of the 5G New Radio standard. URLLC aims to deliver data over the radio channel with a maximum latency of 1 ms and with a reliability of $10^{\wedge}(-5)$. URLLC service may have particular utility in industrial networks, where control information is transferred between various entities. In some examples the control information may be information critical to the running of the industrial service.

Regardless of the high reliability by design of URLLC, and while there are already methods in place for realizing URLLC-level reliability under normal circumstances, it is realised in the present disclosure that an often-overlooked aspect is that URLLC networks may be susceptible to radio jamming. Radio jamming may be considered the jamming, blocking, or interfering of an authorized wireless communication with an interfering (jamming) signal. The apparatus sending out the jamming signal is typically referred to as the radio "jammer". In some examples, the jamming is deliberate. In some examples, the existence of the radio jammer could be malicious. For instance, by jamming a wireless factory even for a short duration, it may be possible to prevent all ongoing manufacturing processes, and cause losses and inconvenience for the manufacturer. In an outdoor deployment, for example in a cargo harbour, wireless connectivity could be destroyed with a drone-based jammer, which could be flown to the protected area.

As realised in the present disclosure, preventing jamming, or at least making URLLC networks more tolerant to jamming, is an aspect for making industrial use-cases of URLLC technically viable for enterprises.

It should also be noted that jamming does not always need to be intentional or malicious. Jamming can also be caused for example by a malfunctioning radio frequency (RF) device, or a device which does not fulfil the spectrum regulations in that area. Nevertheless, even where the jamming is non-malicious, the damaging effects could be the same to the enterprise concerned.

Figure 1:
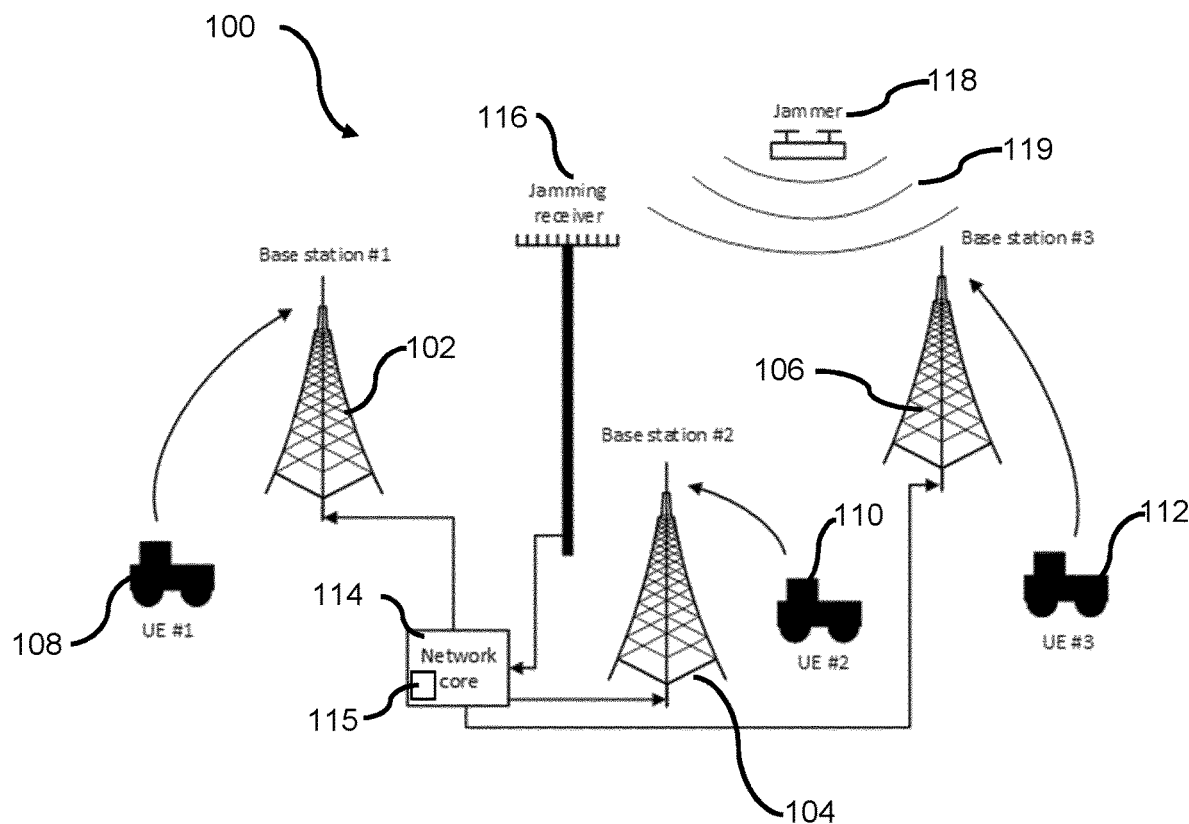
FIG. 1 shows a schematic example of a wireless communication system where an example embodiment may be implemented.

FIG. 1 shows a network or system 100 according to an exemplary embodiment. The system 100 comprises a system configured for URLLC. In some examples, the system comprises an industrial system. In the example of FIG. 1, the system comprises base stations 102, 104 and 106. It will be understood that in other examples more or fewer base stations could be provided. UE 108 is shown in communication with base station 102, UE 110 is shown in communication with base station 104, and UE 112 is shown in communication with base station 106. Of course, the UEs may in practice move around and handover to different base stations within the system. Each UE comprises a communications computing apparatus. For example each UE comprises a mobile phone or tablet, and/or is comprised in an industrial item, such as a sensor, controller, vehicle etc. The base stations are communicatively connected to network core or core network (CN) 114. The network core enables the system 100 to connect to a wider communication network, including for example the Internet. A network core apparatus is schematically shown at 115.

A jamming receiver is schematically shown at 116. In some examples, the jamming receiver is separate from each of the base stations 102, 104, 106. For example, the jamming receiver may be considered remote from or spaced from each of the base stations 102, 104, and 106. To this end, the jamming receiver 116 may be considered a dedicated or auxiliary jamming receiver. Therefore, in some examples it may be considered that the jamming receiver is not a base station and/or is not comprised in a base station. In some alternative examples, the jamming receiver is comprised in a base station apparatus.

A radio jammer is schematically shown at 118. In some examples, the radio jammer 118 comprises a drone, such as an aerial drone. As shown schematically, the jammer 118 transmits interfering radio waves 119, that jam or interfere with authorized communications in the system 100 (e.g. authorized communications between the UE(s), base station(s), and network core, such as scheduled uplink (UL) and downlink (DL) signalling and/or data transmission).

Although a single jamming receiver 116 and a single jammer 118 is shown in the exemplary embodiment of FIG. 1, it will be understood that this is non-limiting, and that system 100 may comprise one or more of each of jamming receiver 116 and jammer 118.

A purpose of the jamming receiver 116 is to listen to the radio frequencies used for the ultra-reliable links within the network or system 100, and detect malicious jamming. In one example, upon detecting a jamming signal, the jamming receiver 116 starts forwarding the jamming signal to the network core 114, which further distributes the jamming signal to the BSs 102, 104, 106 which are providing URLLC connectivity. In another example, the jamming receiver 116 forwards the jamming signal directly to one or more of BSs 102, 104, 106. The jamming signal can then be distributed to the BSs 102, 104, 106 on the jamming receiver-BS and/or BS-BS interfaces (e.g. once the jamming receiver has sent the jamming signal to one or more of the BSs, then the BSs can communicate the jamming signal between each other on the BS-BS interface). Each BS can then cancel the jamming signal at the respective BS, and continue receiving uplink (UL) signals from the UEs 108, 110, 112. In some examples, this concept can be applied to services other than URLLC. For example, the concept can be applied to mobile broadband services.

In some examples, in response to detecting a jamming signal, the jamming receiver 116 obtains a sample waveform of the jamming signal. Obtaining a sample waveform of the jamming signal may comprise extracting a portion of the jamming signal waveform over a time period or time window. In some examples, the jamming receiver 116 saves or stores the sample waveform in a memory of the jamming receiver 116. The jamming receiver 116 then forwards information of the jamming signal to another apparatus. In examples, the another apparatus comprises the network core 114 or an apparatus in the network core, such as apparatus 115. The network core 114 can then send information of the jamming signal to the one or more base stations 102, 104, 106. This centralized approach of the jamming receiver 116 sending the information of the jamming signal to the network core 114, which then sends it to the one or more BSs may introduce a small degree of latency, but in practice this may be considered an acceptable trade-off versus savings elsewhere (e.g. no need for jamming receiver to send the information separately to each base station, no need for each base station to additionally listen to jamming receiver, etc.). Nevertheless, and as mentioned above, it will be understood that in some examples the jamming receiver 116 could directly send information of the jamming signal to the one or more BSs.

In some examples, when the jamming receiver 116 detects a jamming signal, the jamming receiver 116 raises an alert of the jamming signal. In some examples, the alert comprises a flag. The alert may then be sent to, or detected by, the network core 114. In some examples, the alert is sent to the network core 114 by the jamming receiver 116 separately to the sending by the jamming receiver 116 of the sample waveform of the jamming signal. Therefore, in some examples, the jamming receiver 116 can alert the network core 114 of the jamming as quickly as possible by means of the flag, with more detailed information such as the jamming signal waveform to follow once a suitable jamming signal waveform has been obtained.

In some examples, the alert or flag is generated by the network core 114, in addition to or rather than by the jamming receiver. In some examples, the network core 114 detects jamming based on network level performance. For example, if the network core 114 suddenly observes a drop in throughput or an increase in latency over one or more BSs, the network core 114 will trigger a jamming flag in response.

In some examples, if the jamming receiver has also raised the jamming flag, then it can be concluded by the network core that jamming is ongoing. In some examples, the alert or flag is generated by the network core 114 based on information of the jamming signal (e.g. the sample jamming signal waveform) provided by the jamming receiver to the network core. The network core 114 can then raise the alert or flag with the one or more BSs 102, 104, 106.

In some examples, the jamming receiver 116 comprises multiple antennas. In some examples, the jamming receiver 116 comprises a multiple-input and multiple-output (MIMO) apparatus.

In some examples, the jamming receiver 116 is configured to perform beamforming of the receive beam 119 from the jammer 118. Therefore, in some examples, it may be considered that the jamming receiver 116 is configured to steer a receive beam of the jamming receiver 116 towards the detected jamming signal 119.

According to some examples, processes are implemented in order for the jamming receiver 116 to obtain a good sample of the jamming signal 119. For example, processes may be implemented to avoid potentially interfering signals at the jamming receiver 116 from one or more scheduled UEs (e.g. scheduled UL signals). In some examples, the process comprises spatial domain filtering by the jamming receiver 116.

Where spatial domain filtering is employed by the jamming receiver 116, the jamming receiver 116 has knowledge of the location of the potentially interfering UEs. In some examples, information of the position of the UEs can be obtained by the jamming receiver 116 by cellular positioning. Additionally or alternatively, the jamming receiver 116 can use obtained GPS coordinates of the one or more UEs to learn their positions.

The use of GPS coordinates may be particularly applicable in industrial settings. In some examples, the jamming receiver obtains location information of the UEs from the network core 114. Based on knowledge of the potentially interfering UEs, the jamming receiver 116 can then perform null-steering (i.e. not steer the receive beam) towards those potentially interfering UEs. Where there is a quantity of UEs or location spread of UEs that makes it difficult or impossible for them all to be avoided, then in some examples priority is given to avoid the dominant powered UEs. In some examples, dominant powered UEs may be detected by using beamformer weights of received signals from one or more UEs.

In some examples, avoiding interference at the jamming receiver 116 between the jamming signal 119 and the UL scheduled UEs (and in some examples particularly spatially-aligned UL scheduled UEs) is achieved by temporarily disabling scheduled UEs, or in other words temporarily preventing UL from one or more UEs. For example, the one or more BSs may instruct one or more of the UEs to temporarily stop UL transmissions, to improve reception of the jamming signal waveform 119 at the jamming receiver 116. The one or more BSs 102, 104, 106 may take this action based on instruction from the network core 114.

In some examples, the obtaining a sample of the jamming signal waveform at the jamming receiver 116 may be considered continuous (for at least a certain period of time), or iterative. For example, the process may be:
(i) detect jamming signal at jamming receiver;
(ii) jamming receiver begins obtaining sample waveform of jamming signal;
(iii) in response to detected jamming signal, network core instructs BSs to temporarily disable UL of one or more UEs;
(iv) jamming receiver now enabled to obtain improved waveform of jamming signal, due to reduced interreference of UEs
(v) jamming receiver sends improved sample waveform to network core; and so on.

In some examples, the jamming receiver 116 is configured to send the sample waveform to the network core 114 only once a suitable quality waveform has been obtained at the jamming receiver 116. In other examples, the jamming receiver 116 can provide one or more updates of the jamming signal waveform to the network core 114, as improved versions of the waveform are obtained at the jamming receiver (e.g. as part of the above-described iterative process).

It will be appreciated that spatial domain filtering by the jamming receiver 116, and selective temporary UL disabling of the UEs, can be utilised in the alternative or both can be used together, depending on particular examples and circumstances.

According to some examples, the jamming receiver 116 is configured to use energy detection to detect presence of the jamming signal 119. For example, the jamming receiver 116 is configured to observe power levels (energy) of received signals. The jamming receiver 116 may monitor power levels of the received signals over a time window. In some examples, the jamming receiver 116 is configured to detect when an observed power level diverges or differs from an expected average power level. For example, when a jamming signal is present, then the observed power level will increase, and most likely will increase markedly. Therefore, in some examples the jamming receiver 116 is configured to determine or detect presence of a jamming signal when an observed receive power level at the jamming receiver 116 is higher than an expected average receive power level by more than a threshold amount.

According to some examples, key performance indicators (KPIs) are used to detect the presence of a jamming signal. When deterioration of one or more KPIs is detected, then it is considered likely that jamming is ongoing. In some examples, the monitored KPIs comprise one or more of: throughput; block error rate (BLER); latency.

In some examples, monitoring of the KPIs is performed at the jamming receiver 116. In such examples, the jamming receiver requests the one or more KPIs from the network core 114.

Additionally or alternatively, the monitoring of the KPIs may take place at the network core 114, and the network core 114 performs a decision of whether there is network jamming, based at least in part on those KPIs.

In some examples the one or more BSs 102, 104, 106 send the KPI information to the network core 114.

In some examples, the detection of a jamming signal is performed by a combination of the jamming receiver 116 and the network core 114. For example, the jamming receiver may use energy detection for initial detection of a jamming signal. In response to initial detection by the jamming receiver 116, the network core 114 may then use KPIs for a more refined determination of whether a jamming signal is present. That is, it may be considered in some examples that the jamming receiver performs an initial detection of a jamming signal, with the network core 114 then performing a more refined estimate of whether there is a jamming signal. In some examples, the initial detection of a jamming signal is performed by the jamming receiver 116 using energy detection, and the network core then performs the more refined estimate using the KPIs.

In some examples, the jamming receiver 116 stores the sample of the jamming signal waveform, and sends a copy of the sample to the network core 114 (or in some examples, directly to the one or more base stations).

In some examples, the sample waveform is sent to the network core 114 by the jamming receiver 116 in a raw form or a substantially raw form. For example, the sample waveform may be sent to the network core 114 without compression or with minimal compression.

In some examples, obtaining the sample waveform at the jamming receiver 116 comprises filtering. For example, the jamming receiver 116 may filter the received signal captured by the jamming receiver based on a detected bandwidth of the jamming signal, and filter out signals outside the detected frequency band occupied by the jamming signal.

In some examples, the jamming receiver 116 employs digital beamforming in order to improve the stored jamming signal.

In some examples, the jamming receiver 116 is placed at a height or altitude that is higher than the one or more base stations 102, 104, 106. Where the jammer is an aerial drone, this may improve the reception of the jamming signal at the jamming receiver 116.

For discussion of base station functionality, a single base station 102 may be considered. Nevertheless, it will be understood that the functionality may apply to one or more base stations 102, 104, 106.

Following detection of a jamming signal, for example by the jamming receiver and/or the network core 114, the BS 102 receives a sample waveform of the jamming signal. In some examples, the sample waveform is received at the BS 102 from the core network 114, e.g. from core network apparatus 115. In some examples, the sample waveform is received at the BS 102 directly from the jamming receiver 116.

The BS 102 then uses the received sample waveform to initiate interference cancellation of the jamming signal.

According to some examples, the BS 102 employs a cancellation algorithm in order to cancel the jamming signal. A cancellation algorithm according to an exemplary embodiment will now be described.

An original jamming signal is denoted by z (n). Assuming a line-of-sight (LOS) channel with only negligible multipath propagation between the jammer 118 and the jamming receiver 116, the total signal received by the jamming receiver is as follows:

$$y_{JRX}(n) \approx h_J z(n) + d_{JRX}(n),$$

where $h_J$ is the unknown channel of the jamming signal and $d_{JRX}(n)$ represents the authenticated signals of the network (including the channel effects). For example, the authenticated signals may comprise UE UL signals.

The IQ samples corresponding to the jamming signal are then sent from the jamming receiver 116 to the network core 114. The network core 114 then provides the IQ samples to the individual BSs 102, 104, 106. The IQ samples refer to the in-phase (I) and quadrature (Q) components of RF modulated waveforms.

Taking a realistic assumption that the jamming power is not sufficiently high to saturate the BS 102 analog-to-digital converter (ADC), the over-the-air signal received by an individual BS 102 can be expressed as $$y_{RX}(n) \approx h_{JBS}^H z_n + h_d^H d_n + w(n),$$

where $h_{JBS}$ is the multipath channel between the jammer 118 and the BS 102, $z_n$ is a vector collecting M latest samples of the jamming signal (which are only known up to a complex scaling factor through $y_{JRX}(n) \approx h_J z(n) + d_{JRX}(n)$), $h_d$ is the channel of a desired UL signal, $d_n$ contains M latest samples of the desired signal d(n), and w(n) represents the noise-plus-interference signal.

In some examples, the BS 102 synchronizes the sample waveform of the jamming signal (e.g. received from network core 114), with the received composite waveform comprising both authenticated UL signals and the jamming signal 119 as actually received at the BS 102 from jammer 118. In some examples, the synchronization is performed if the time delay of the jamming signal received from the network core is unknown. The unknown delay, denoted by d, can be determined by cross-correlating it with the received UL signal as follows:

$$c(m) = \sum_{n=-W}^{W} y_{RX}^*(n) y_{JRX}(n-d+m),$$

where $y_{JRX}(n)$ is the received jamming signal, $y_{RX}(n)$ is the received UL signal, $(\ )^*$ denotes the complex conjugate, and W is the correlation window. It is known a priori that the received jamming signal is delayed with respect to the UL signal (d>0). Therefore, it suffices to search through only the positive values of m, starting from zero and up to a predefined maximum lag $D_{max}$. The synchronization logic can be done according to the following steps:

1. Set m=0
2. Calculate absolute value of the correlation as |c(m)| and store to memory
3. Increment m
4. If $m \leq D_{max}$ go back to 2
5. Choose $$\hat{d} = \underset{0 \leq m \leq D_{max}}{\operatorname{argmax}} |c(m)|$$

Then, assuming that $\hat{d} \approx d$, it is trivially possible to obtain $y_{JRX}(n)$ without the delay d. Once synchronized in this manner, the BS 102 can begin interference cancellation of the jamming signal 119.

Assuming a relatively static channel between the jamming receiver 116 and the BS 102, the BS 102 can cancel the jamming signal as follows:

$$y_{RXC}(n) = h_{JBS}^H z_n - \hat{h}^H y_{n,JRX} + h_d^H d_n + w(n),$$

where $\hat{h}$ denotes a channel estimate at the BS 102, and $y_{n,JRX} = h_j z_n + h_{J,d} d_n + i_n$ contains the M latest samples of the jamming signal observation provided by the jamming receiver 116, together with the leaked UL signals such that $h_{j,d}$ is the unknown channel between the desired UL signal and the jamming receiver, and $i_n$ contains the other UL signals over the time window M. It is assumed that the channel between the jamming receiver and the jammer remains static for the duration of the window length M. It is also assumed for notational simplicity that the channels between the UL transmitters and the jamming receiver are LOS, although the described process can be repeated for any type of channel propagation.

From the above equation it is clear that the jamming signal 119 of the jammer 118 can be suppressed by learning such parameters that $$\hat{h}^H \approx \frac{h_{JBS}^H}{h_J}.$$

In some examples this is achieved with a least mean squares learning rule as follows:

$$\hat{h} = \hat{h} + \mu y_{RXC}^*(n) y_{n,JRX}.$$

This learning rule will aim at minimizing the instantaneous energy of the signal $y_{RXC}(n)$. Therefore, in some examples it may be considered that the BS 102 is configured to use a learning rule to minimize energy of the jamming signal. It may also be considered that the sample waveform received at the BS 102 comprises an input to the learning rule.

According to some examples, the BS 102 is configured to use the learning rule to select a most suitable filter for filtering the jamming signal at the BS 102.

According to some examples, choosing a suitable filter comprises choosing a most suitable filter coefficient for the signal $y_{JRX}(n)$.

Note that in examples the above learning rule will not cancel the desired UL signal, even though the desired UL signal is included in the cancellation signal as shown above. A reason for this is that the desired UL signal can be expected to be considerably weaker at the jamming receiver 116, and hence the overall energy of the cancelled signal is minimized only when the jamming signal 119 is cancelled. The coefficients that cancel the desired UL signal only represent a local minima. Moreover, it is improbable in practice that the same channel coefficients would minimize both the jamming signal 119 and a desired UL signal.

Upon convergence, $$\hat{h}^H \approx \frac{h_{JBS}^H}{h_J}$$

and the residual signal can be written as follows:

$$y_{RXC}(n) = h_d^H d_n + h_{JBS}^H z_n - \frac{h_{JBS}^H}{h_J}(h_J z_n + h_{J,d} d_n + i_d) + w(n) \approx$$

$$\left(h_d^H - \frac{h_{J,d}}{h_J} h_{JBS}^H\right) d_n + w(n) - \frac{h_{JBS}^H}{h_J} i_n = \tilde{h}_d^H d_n + \tilde{w}(n).$$

As can be observed, the desired UL signal still follows a same form as without jamming, only with modified channel coefficients. In other words, by considering the canceller as a part of the wireless channel, its effects can be compensated for by the regular estimation and equalization solutions.

Figure 2:
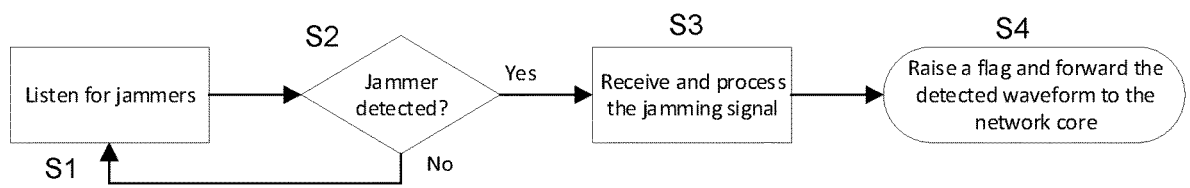
FIG. 2 is a flow chart showing a method of operation of a jamming receiver, according to an example embodiment.
Figure 3:
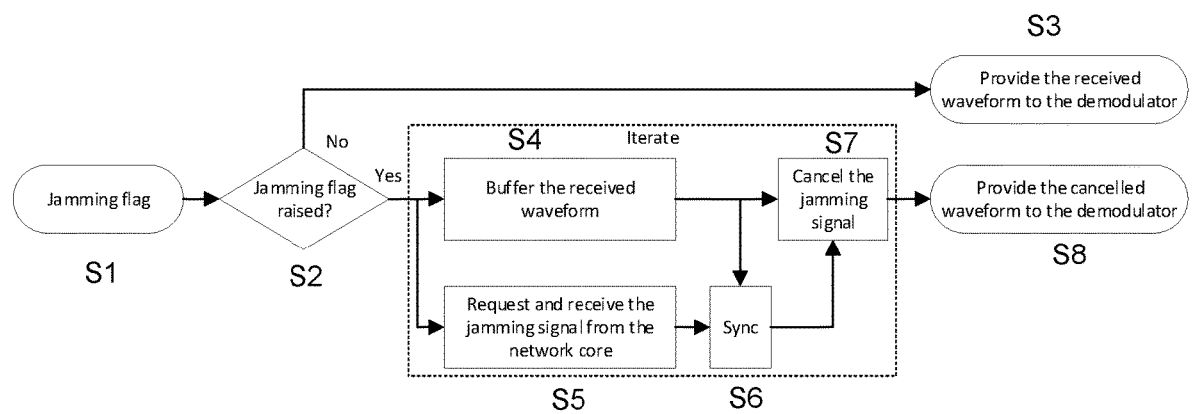
FIG. 3 is a flow chart showing a method of operation of a base station, according to an example embodiment.
Figure 4:
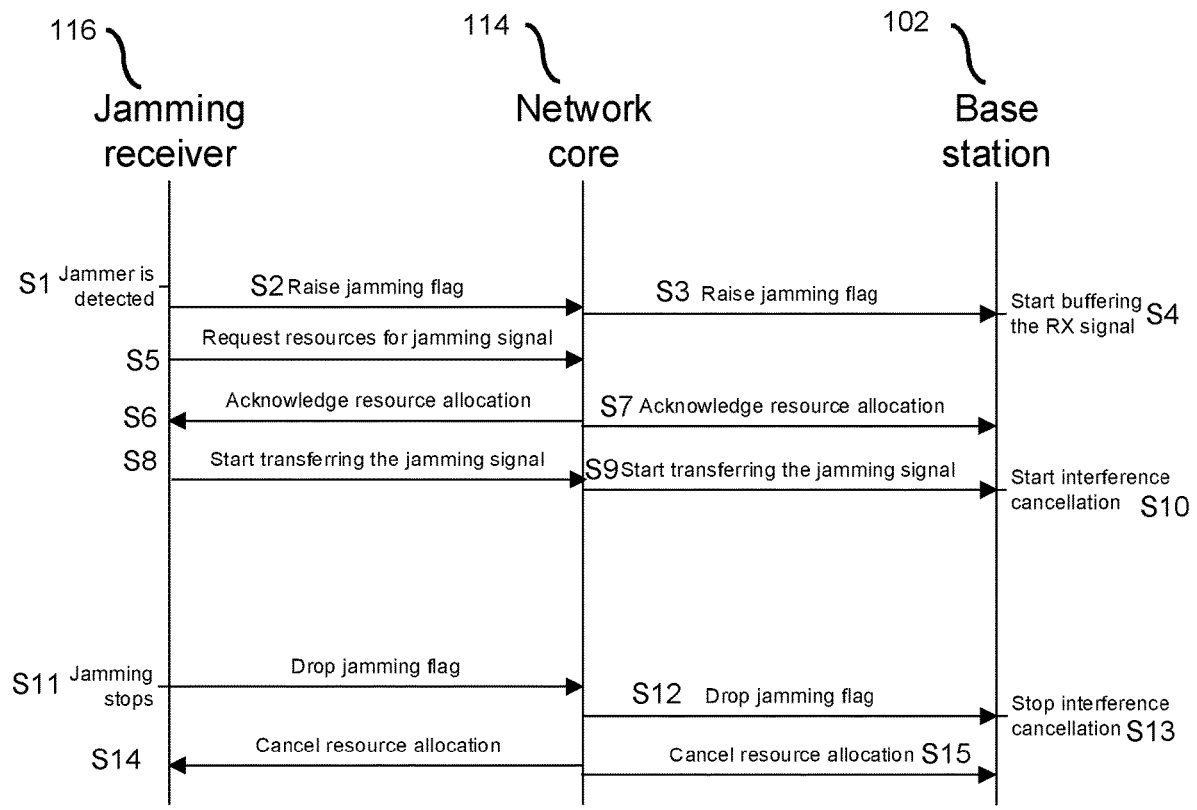
FIG. 4 is a signalling diagram showing communications between a jamming receiver, a network core, and a base station, according to an example embodiment.

An example embodiment will now be further explained with a worked example with respect to FIGS. 2, 3 and 4.

FIG. 2 schematically shows a method according to an exemplary embodiment, as viewed from the jamming receiver 116.

At S1, the jamming receiver 116 listens for a jamming signal.

At S2, when no jammer is detected, the method loops back to S1 and the jamming receiver 116 continues to listen for jammers. Therefore, in some examples it may be considered that the jamming receiver 116 continually listens for or monitors for jamming signals.

On the other hand, when a jamming signal is detected by the jamming receiver 116 at S2, then the method proceeds to S3.

At S3, the jamming receiver 116 receives and processes the jamming signal. For example, as described in more detail above, the jamming receiver 116 processes the jamming signal to produce a sample waveform of the jamming signal. The sample waveform may also be stored at the jamming receiver 116.

At S4, the jamming receiver 116 forwards the sample waveform of the detected jamming signal to the network core 114. Optionally, the jamming receiver 116 may also raise a flag, indicating that a jammer is present. Additionally or alternatively, the flag may be raised by the network core 114.

FIG. 3 schematically shows a method according to an exemplary embodiment, as viewed from base station 102.

S1 denotes that the base station 102 is configured to monitor for the presence or absence of a jammer, for example by monitoring whether a jamming flag has been raised.

As shown at S2, when it is determined by the BS 102 that no jamming flag has been raised, then the method proceeds to S3 and the BS 102 forwards received waveforms (e.g waveforms from authorised transmitters such as authorised UEs) to a demodulator of the BS 102 for processing.

If, on the other hand, it is determined at S2 that a jamming flag has been raised, then the method proceeds to S4.

At S4, received waveforms are buffered at the BS 102. The received waveforms that are buffered may comprise both authorised waveforms and the jamming signal waveform 119.

At S5, the BS 102 requests and receives the sample waveform of the jamming signal from the network core 114.

S5 may occur in parallel with S4.

At S6 the BS 102 synchronizes the waveforms. That is, at S6 the BS 102 synchronizes the sample waveform received from the network core, with the jamming signal 119 as received at the BS 102 from the jammer 118.

Following synchronization, at S7 the jamming signal is cancelled by using interreference cancellation, as described above.

At S8, the cancelled waveform is forwarded to the demodulator of the BS 102. FIG. 4 is a signalling diagram, showing signalling according to an exemplary embodiment between jamming receiver 116, network core 114 and base station 102. At S1, presence of a jammer 118 is detected by jamming receiver 116, for example by energy detection.

In response to the detection, at S2 the jamming receiver 116 raises a jamming flag to the network core 114.

At S3, the network core 114 also raises a jamming flag, to notify the base station 102 of the presence of the jammer. Although only one BS 102 is shown in FIG. 4 for the purposes of explanation, it will be understood that network core 114 will also raise the jamming flag to other affected or potentially affected BSs (e.g. BSs 104 and 106).

At S4, BS 102 starts buffering its Rx signal.

At S5, the jamming receiver 116 sends a request for resources for the jamming signal to the network core 114.

At S6, the network core 114 acknowledges the resource allocation. For example, the resource allocation may be an allocation of backhaul resources.

At S7, the network core also acknowledges resource allocation to BS 102. In some examples, the resource allocation being acknowledged at S7 is resource allocation for both the jamming receiver 116 and the BS 102. This is because in some examples the jamming signal is first backhauled from the jamming receiver 116 to the network core 114, after which the network core 114 backhauls it to the BS 102. However, in some examples the BS 102 does not have to request the resources, because the resources are automatically given to the BS 102 by the network core 114 once jamming is detected.

At S8, the jamming receiver 116 starts transferring the jamming signal to the network core 114. For example, the jamming receiver 116 starts transferring a sample waveform of the jamming signal, as previously described.

At S9, the network core 114 starts transferring the jamming signal sample waveform to the BS 102.

At S10, the BS 102 starts interference cancellation, in the manner previously described.

Figure 5:
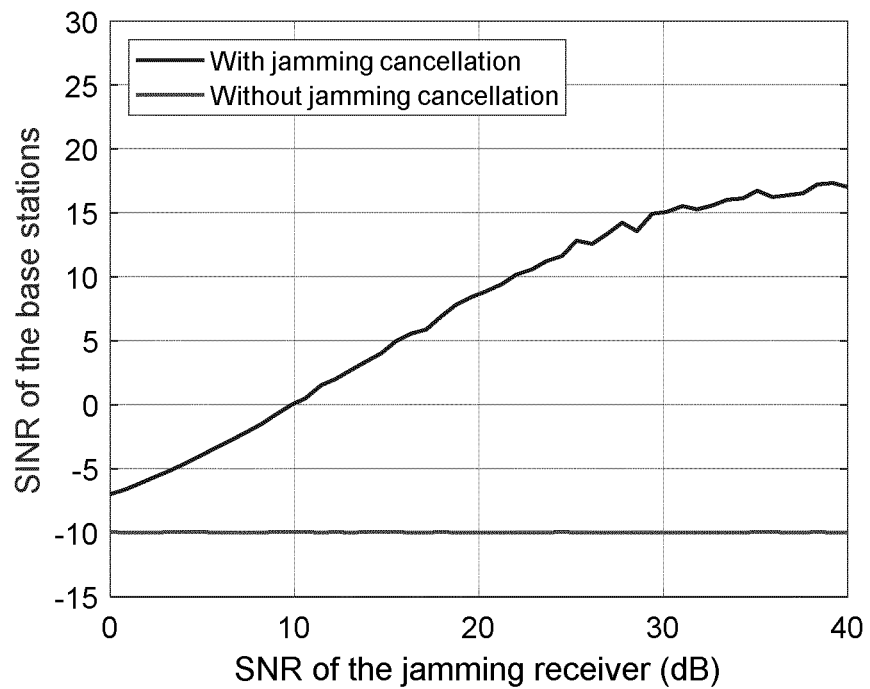
FIG. 5 is a plot illustrating SINR of a base station, according to an example.

FIG. 5 is a simulation result which illustrates a benefit of the proposed scheme. In the simulation of FIG. 5 a scenario is considered where an individual jamming receiver obtains the jamming signal through a LOS channel with some predefined signal-to-noise ratio (SNR). It is assumed that the signal received by the jamming receiver also contains the desired UL signal such that it is 30 dB weaker than the jamming signal. This contaminated replica of the jamming signal is then provided via backhaul link to a BS, which is receiving the jamming signal via 10-tap Rayleigh fading channel, in addition to the desired RX signal. The signal-to-interference-plus-noise ratio (SINR) of the BS is fixed at −10 dB, meaning that the jamming is relatively severe.

FIG. 5 plots the SINR of the BS with respect to the reception quality of the jamming receiver, considering the cases with and without the proposed jamming cancellation scheme. In FIG. 5, the upper curve is with jamming cancellation and the lower curve is without jamming cancellation. Without any cancellation, the SINR of the BS is −10 dB, as mentioned above. As shown in the simulation result, the cancellation scheme can considerably improve the SINR. Considering that the jamming receiver can in practice be expected to be closer to the jammer than the BS (and perhaps much closer), it is reasonable to expect the SNR of the jamming receiver to be in the order of 15-30 dB. With such SNRs, the cancellation scheme can suppress the jammer at the BS such that signal reception is again possible. For instance, with a 20 dB SNR at the jamming receiver, the SINR after cancellation at the BS is nearly 10 dB, which is enough for many modulation and coding schemes.

It will be understood from the foregoing that in exemplary embodiments, a jamming signal can be cancelled (or at least mitigated), by interference cancellation rather than, for example, trying to avoid the presence of a jammer. Therefore, the disclosed concepts may have particular utility where it is not practical to physically prevent the presence of jammers, for example in outdoor industrial areas which can be entered by drones. Moreover, the disclosed concept can apply to wideband jamming signals as well as narrowband jamming.

In exemplary embodiments, the jamming cancellation scheme is waveform-agnostic. That is, it may be considered that the cancellation scheme works for any waveform. Moreover, the proposed scheme can suppress the jamming signal even under severe jamming powers, as is evident for example from the simulation results of FIG. 5.

For conciseness, in the exemplary embodiments described herein a single jammer 118 is shown within the system 100. It will be understood that in practice there may be more than one jammer present at any one time. To this end, in some examples the jamming receiver 116 may be configured to process more than one jamming signal in parallel. In some examples, in practice there may be more than one jamming receiver 116 in the system 100. In such examples, the network core 114 may co-ordinate the multiple jamming receivers to process the one or more jamming signals. For example, each jamming receiver may be co-ordinated to process the relatively strongest jamming signal(s) that it is receiving. The core network 114 may also perform load balancing of the multiple jamming receivers in such scenarios.

It will be understood that the proposed scheme can also be extended to downlink (DL) reception with minimal changes, if there are extra radio resources available outside the jamming bandwidth. Then, the BS can transfer the jamming waveform to the UEs over these extra radio resources and the UE will carry out the cancellation procedure, in a similar manner to the BS.

Figure 6:
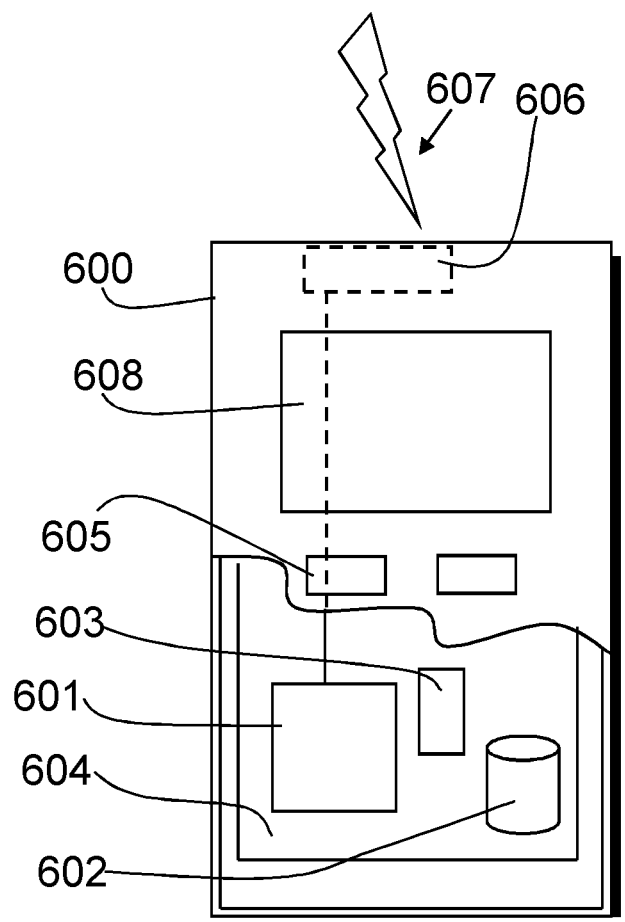
FIG. 6 schematically shows elements of a user equipment, according to an example.

A possible wireless communication device will now be described in more detail with reference to FIG. 6 showing a schematic, partially sectioned view of a communication device 600. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 600 may receive signals over an air or radio interface 607 via appropriate apparatus for receiving and may transmit signals via appropriate apparatus for transmitting radio signals. In FIG. 6, transceiver apparatus is designated schematically by block 606. The transceiver apparatus 606 may be provided for example by means of a radio part and associated antenna arrangement. The antenna arrangement may be arranged internally or externally to the wireless device.

A wireless device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the wireless device by means of a suitable user interface such as key pad 605, voice commands, touch sensitive screen or pad, combinations thereof or the like. A display 608, a speaker and a microphone can be also provided. Furthermore, a wireless communication device may comprise appropriate connectors (either wired or wireless) to other devices and/or for connecting external accessories, for example hands-free equipment, thereto.

For example, UEs 108, 110, 112 shown in FIG. 1 may have the technical features of exemplary UE 600.

Figure 7:
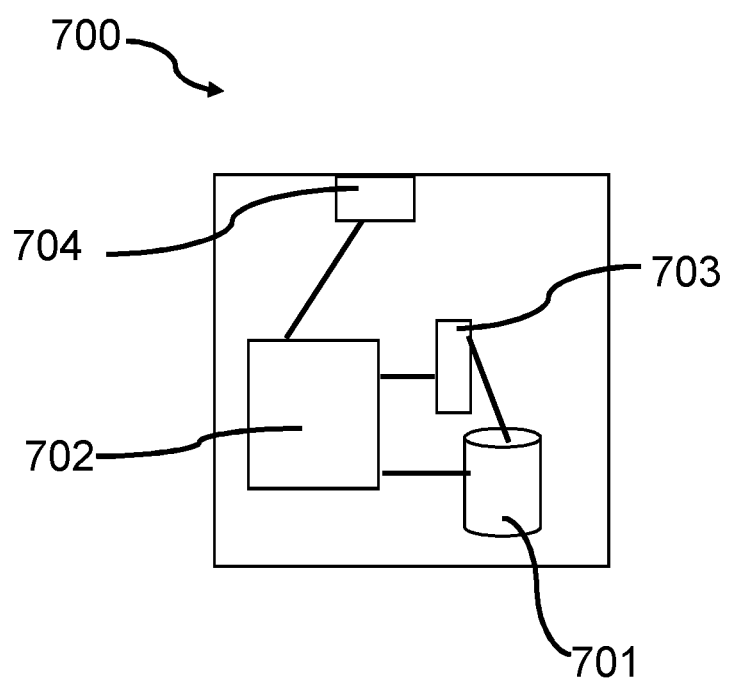
FIG. 7 schematically shows elements of a control apparatus, according to an example.

FIG. 7 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, or an auxiliary apparatus such as a jamming receiver. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 700 can be arranged to provide control on communications in the service area of the system. The control apparatus 700 comprises at least one memory 701, at least one data processing unit 702, 703 and an input/output interface 704. Via the interface the control apparatus can be coupled to a receiver and a transmitter of the base station. The receiver and/or the transmitter may be implemented as a radio front end or a remote radio head. For example the control apparatus 700 or processor 701 can be configured to execute an appropriate software code to provide the control functions.

Figure 8:
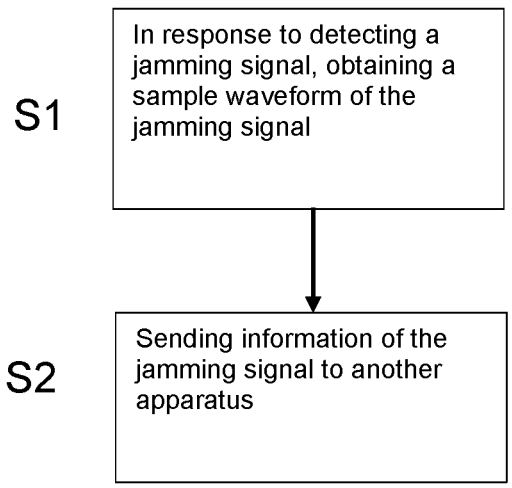
FIG. 8 is a flow-chart of a method according to an example.

FIG. 8 is a flow-chart of a method according to an example. The method of FIG. 8 is carried out at an apparatus. The apparatus may be, for example, a jamming signal receiver.

At S1, the method comprises the apparatus, in response to detecting a jamming signal, obtaining a sample waveform of the jamming signal.

At S2, the method comprises the apparatus sending information of the jamming signal to another apparatus.

Figure 9:
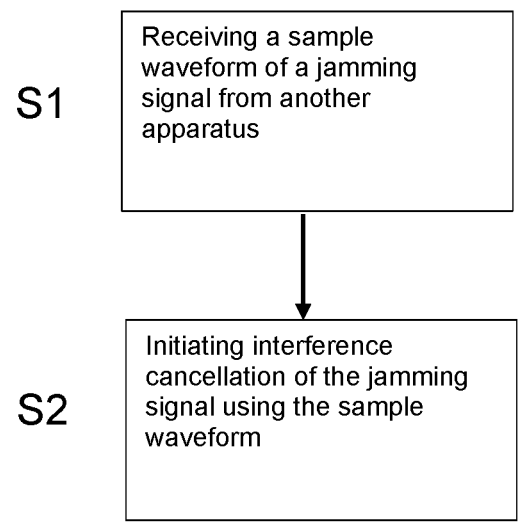
FIG. 9 is a flow-chart of a method according to an example.

FIG. 9 is a flow-chart of a method according to an example. The method of FIG. 9 is carried out at an apparatus. The apparatus may be, for example, a base station.

At S1, the method comprises the apparatus receiving a sample waveform of a jamming signal from another apparatus.

At S2, the method comprises the apparatus initiating interference cancellation of the jamming signal using the sample waveform.

Figure 10:
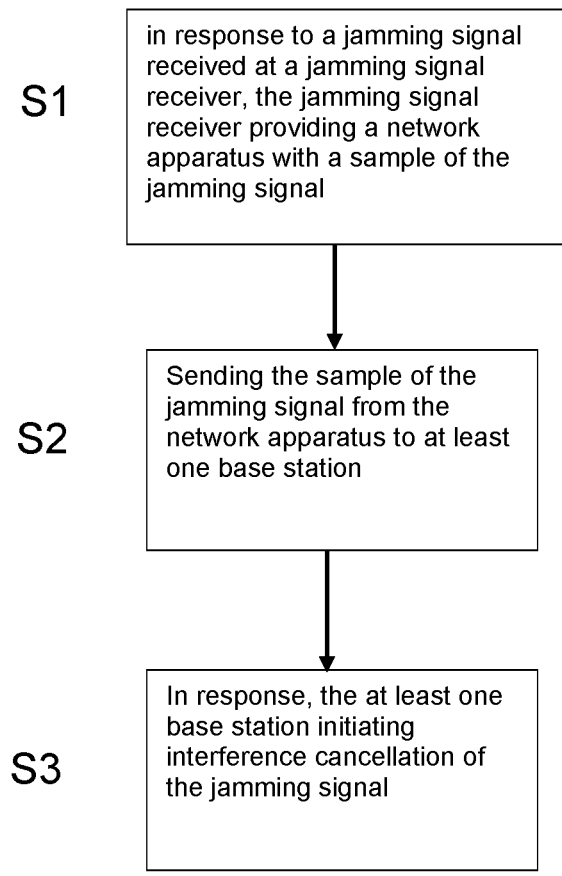
FIG. 10 is a flow-chart of a method according to an example.

FIG. 10 is a flow-chart of a method according to an example. The method of FIG. 10 is carried out in a system.

At S1, the method comprises, in response to a jamming signal received at a jamming signal receiver, the jamming signal receiver providing a network apparatus with a sample of the jamming signal.

At S2, the method comprises sending the sample of the jamming signal from the network apparatus to at least one base station At S3, the method comprises, in response, the at least one base station initiating interference cancellation of the jamming signal.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
   at least one processor; and
   at least one memory including computer program code, the at least one memory and computer program code configured to, with the at least one processor, cause the apparatus to perform:
   in response to detecting a jamming signal, obtaining a sample waveform of the jamming signal; and
   sending information of the obtained sample waveform of the jamming signal to another apparatus, wherein the information of the obtained sample waveform comprises an input to a learning rule configured to minimize energy of the jamming signal.

2. The apparatus according to claim 1, wherein the at least one memory and computer program code are further configured, with the at least one processor, to cause the apparatus to perform steering a receive beam of the apparatus towards the detected jamming signal.

3. The apparatus according to claim 1, wherein the at least one memory and computer program code are further configured, with the at least one processor, to cause the apparatus to perform avoiding interfering signals from one or more scheduled user equipment, when obtaining the sample waveform.

4. The apparatus according to claim 3, wherein the at least one memory and computer program code are further configured, with the at least one processor, to cause the apparatus to perform spatial domain filtering in order to avoid the interfering signals from one or more scheduled user equipment.

5. The apparatus according to claim 3, wherein the at least one memory and computer program code are further configured, with the at least one processor, to cause the apparatus to perform null-steering towards the one or more scheduled user equipment.

6. The apparatus according to claim 1, wherein the at least one memory and computer program code are further configured, with the at least one processor, to cause the apparatus using energy detection in order to perform the detecting a jamming signal.

7. The apparatus according to claim 1, wherein the at least one memory and computer program code are further configured, with the at least one processor, to cause the apparatus to perform using one or more key performance indicators to perform the detecting a jamming signal.

8. The apparatus according to claim 7, wherein the at least one memory and computer program code are further configured, with the at least one processor, to cause the apparatus to perform requesting the one or more key performance indicators.

9. The apparatus according to claim 1, wherein the at least one memory and computer program code are further configured, with the at least one processor, to cause the apparatus to perform generating a flag, the information of the jamming signal comprising the flag.

10. The apparatus according to claim 1, wherein the sending information of the jamming signal comprises sending the obtained sample waveform to the another apparatus.

11. The apparatus according to claim 1, wherein the at least one memory and computer program code are further configured, with the at least one processor, to cause the apparatus to perform processing of the obtained sample in order to improve the sample.

12. The apparatus according to claim 11, wherein the processing the obtained sample comprises filtering the jamming signal based on a detected bandwidth of the jamming signal.

13. The apparatus according to claim 1, wherein the apparatus comprises a dedicated jamming signal receiver, located separately from one or more base stations.

14. An apparatus, comprising:
  at least one processor; and
  at least one memory including computer program code, the at least one memory and computer program code configured to, with the at least one processor, cause the apparatus to perform:
  receiving a sample waveform of a jamming signal from another apparatus;
  initiating interference cancellation of the jamming signal using the sample waveform; and
  using a learning rule configured to minimize energy of the jamming signal.

15. The apparatus according to claim 14, wherein the at least one memory and computer program code are further configured, with the at least one processor, to cause the apparatus to perform synchronizing the received sample waveform with the jamming signal as received at the apparatus from a source of the jamming signal, the source of the jamming signal comprising a jammer.

16. The apparatus according to claim 14, wherein the received sample waveform comprises an input to the learning rule.

17. The apparatus according to claim 14, wherein the at least one memory and computer program code are further configured, with the at least one processor, to cause the apparatus to perform using an output of the learning rule to select a filter for filtering the jamming signal.

18. The apparatus according to claim 14, wherein the at least one memory and computer program code are further configured, with the at least one processor, to cause the apparatus to perform temporarily disabling uplink scheduling of one or more user equipment, in order to improve a quality of the received sample waveform.

19. The apparatus according to claim 14, wherein the apparatus comprises a base station.

20. A method, comprising:
  in response to detecting a jamming signal at an apparatus, obtaining a sample waveform of the jamming signal; and
  sending information of the obtained sample waveform of the jamming signal to another apparatus, wherein the information of the obtained sample waveform comprises an input to a learning rule configured to minimize energy of the jamming signal.

21. A computer program embodied on a non-transitory computer-readable medium, said computer program comprising instructions for causing an apparatus to perform the method of claim 20.

22. A method, comprising:
  receiving, at an apparatus, a sample waveform of a jamming signal from another apparatus;
  initiating interference cancellation of the jamming signal using the sample waveform; and
  using a learning rule configured to minimize energy of the jamming.

23. A computer program embodied on a non-transitory computer-readable medium, said computer program comprising instructions for causing an apparatus to perform the method of claim 22.

* * * * *